Aug. 7, 1923. 1,464,056
R. ALLEN
APPLIANCE FOR INSERTING PISTON RINGS OR THE LIKE IN THEIR GROOVES
OR REMOVING THEM THEREFROM
Filed March 2, 1920  2 Sheets-Sheet 1
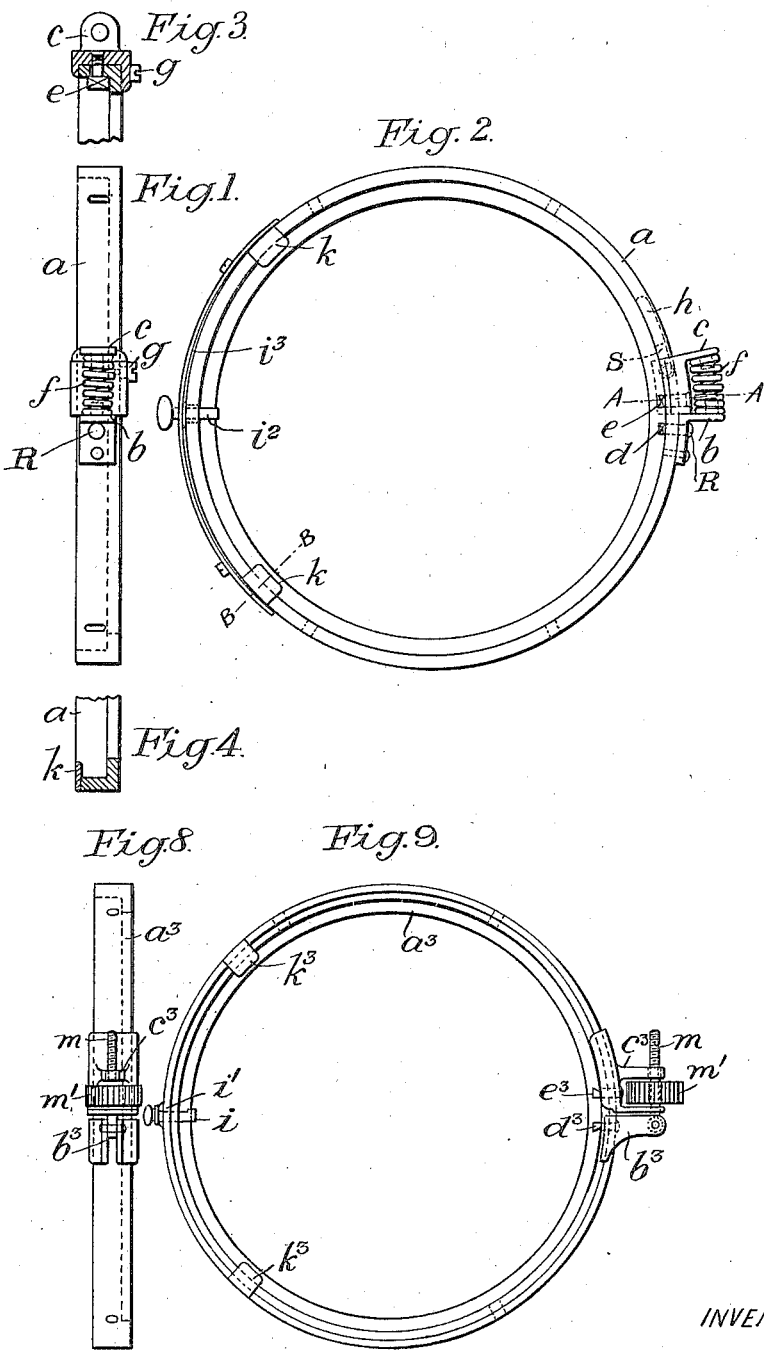
INVENTOR
ROBERT ALLEN
ATTORNEYS Aug. 7, 1923.                                                          1,464,056
R. ALLEN
APPLIANCE FOR INSERTING PISTON RINGS OR THE LIKE IN THEIR GROOVES
OR REMOVING THEM THEREFROM
Filed March 2, 1920                           2 Sheets-Sheet 2
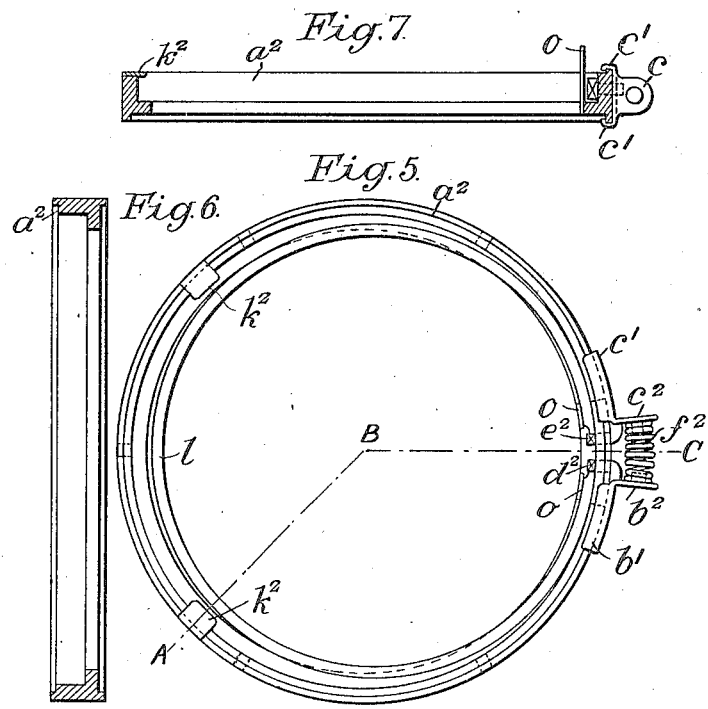
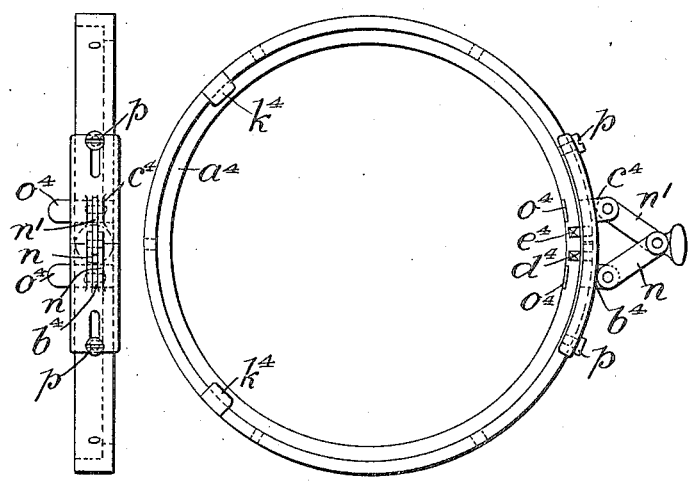
INVENTOR
ROBERT ALLEN
BY
ATTORNEYS Patented Aug. 7, 1923.

1,464,056

UNITED STATES PATENT OFFICE.

ROBERT ALLEN, OF WOODCOTE, NEAR READING, ENGLAND.

APPLIANCE FOR INSERTING PISTON RINGS OR THE LIKE IN THEIR GROOVES OR REMOVING THEM THEREFROM.

Application filed March 2, 1920. Serial No. 362,704.

(GRANTED UNDER THE PROVISIONS OF THE ACT OF MARCH 3, 1921, 41 STAT. L., 1313.)

*To all whom it may concern:*

Be it known that ROBERT ALLEN, a subject of the King of Great Britain and Ireland, and a resident of Chiltern Rise, Woodcote, near Reading, county of Berkshire, England, has invented certain new and useful Improvements in Appliances for Inserting Piston Rings or the like in Their Grooves or Removing Them Therefrom (for which I have filed an application in Great Britain, No. 124,285, dated 21st March, 1918), of which the following is a specification.

This invention relates to an improved appliance for inserting piston rings or the like in their grooves or removing them therefrom, and particularly to appliances in which a flanged ring or annular member adapted to be placed loosely over the piston ring is provided with means for opening the piston ring at the joint and thereby expanding the same into the annular member thus increasing the diameter to such an extent that the said piston ring can be slid on or off the piston.

According to this invention a pair of external lugs are mounted on the periphery of the annular member, one or both of the lugs being capable of sliding thereon circumferentially to a limited extent, to permit the lugs to be brought close together by hand and moved apart by a spring in the case of light rings or they may be operated for the same purpose by screw and nut mechanism, toggle levers or analogous means as hereinafter described.

Associated with the lugs on the annular member are internal fingers adapted to enter the joint of the piston ring to expand the ring. Where one of the lugs only is movable one of the fingers is connected thereto and movable with it while the other is fixed, but when both lugs are movable both fingers are likewise movable.

Means are also provided at a point in the annular member diametrically opposite the internal projections or fingers for pressing the piston ring towards the fingers to enable them to properly engage in the joint of the ring, and shallow retaining lugs or flanges may also be provided to keep the piston ring in position in the annular member.

In the accompanying drawings Figs. 1 and 2 are side and end elevations respectively of an appliance for inserting and removing piston rings, constructed according to this invention.

Figs. 3 and 4 are sections taken respectively at A—A and B—B Fig. 2.

Figs. 5 and 6 are end and sectional elevations illustrating a modified form of construction.

Fig. 7 is a section taken at A—B—C Fig. 5.

Figs. 8 and 9 are similar views to Figs 1 and 2 illustrating a further modified form of construction.

Figs. 10 and 11 are also similar views to Figs. 1 and 2 illustrating a further modified form of construction.

Referring to Figs. 1 to 4 the annular member $a$ as shown consists of a ring of angle section, the larger internal diameter of which is such that when the piston ring is fully expanded within it, both the member $a$ and piston ring can slide freely over the piston in the act of placing the piston ring in position in its groove or removing it. Fixed and movable lugs $b$ $c$ are applied to the periphery of the annular member $a$ and corresponding fixed and movable fingers or claws $d$ $e$ project into the interior of the ring, the fixed finger $d$ being conveniently formed as illustrated in Fig. 2 by an extension or enlargement of one of a pair of rivets R employed for fixing the lug $b$ in position, whilst the movable finger or claw $e$ passes through a peripheral slot S in the member $a$ into an opening in the movable lug $c$ where it is secured so as to partake of the movement of the lug. A spring $f$ interposed between the lugs $b$ $c$ is employed in this form of the appliance for moving the lug $c$ and its finger $e$ away from the fixed lug and finger $b$ $d$ the same parts being brought together by applying pressure to the lugs with the thumb and finger. As shown the movable lug $c$ is guided on the member $a$ by side flanges into one of which a screw $g$ is inserted and projects into a guide groove $h$ in the member $a$. The fingers $d$ $e$ which are intended to engage in the joint of the piston ring and bear against the adjacent ends of the ring are suitably shaped on their engaging faces to obtain a grip or hold on said ends of the ring while opening the joint to expand the ring.

In order further to insure engagement of the fingers a radial plunger $i^2$ is mounted in the member $a$ opposite the fingers $d$ $e$ and pressed inwards against the piston ring by the action of a spring $i^3$ to force the piston ring in the direction of the fingers. It will be seen that plunger $i^2$ would be forced outwards by the expansion of the piston ring, but it may also be withdrawn by hand so as not to engage in the groove in the piston and interfere with the removal of the appliance after placing a ring in position in its groove. To assist in keeping the piston ring in coaxial relation with member $a$ while the ring is being expanded, lugs or flanges $k$ of small radial dimensions are fixed on the part of member $a$ of larger internal diameter.

In the form of construction shown in Figs. 5 to 7 both the lugs $b^2$ $c^2$ are mounted to slide on the annular member $a^2$ and fingers or claws $d^2$ $e^2$ fixed to the lugs project inwards through circumferential slots in the member $a$ and move with the lugs which are spread apart by a spring $f^2$. As will be seen the lugs in this case are retained on the member $a^2$ by inturned flanges $b^1$ $c^1$ engaging projecting rim portions formed on the member $a^2$. In other respects this form of the appliance is constructed and operates in the manner described with reference to Figs. 1 to 4, a piston ring $l$ being shown in position and engaged by the fingers or claws $d^2$ $e^2$, and by fixed flanges $k^2$ on ring $a^2$. Spring fingers $o$ in this form of construction hold the fingers of the ring against the fingers $d^2$ $e^2$.

The modified form of construction illustrated in Figs. 8 and 9 is intended for use with stronger or heavier piston rings. Fixed and movable lugs $b^3$ $c^3$ are provided as in Figs. 1 to 4 but in this case, instead of expanding the piston ring by the action of a spring, a screw and nut mechanism is employed, a screw threaded pin $m$ being connected with the fixed lug $b^3$ and sliding through apertures in a forked or bifurcated part of the movable lug $c^3$ between which a milled nut $m^1$ working on the pin $m$, is confined. A hexagon or other form of nut could be used in lieu of the milled nut.

A plunger $i$ for forcing the piston ring towards the engaging fingers or claws $d^2$ $e^3$ is in this arrangement intended to be pressed inwards by hand instead of by spring and is retained in an aperture in the member $a^3$ by a pin $i^1$ which lies in the path of a shoulder formed at the inner end of the plunger by cutting away a portion of the plunger as shown. The lugs $b^3$ $c^3$ carry fingers $d^3$ $e^3$, and flanges $k^3$ are preferably used as in the forms of construction above described.

Figs. 10 and 11 illustrate the application of toggle mechanism to movable lugs $b^4$ $c^4$ for operating them and their attached fingers or claws $d^4$ $e^4$.

A pair of parallel links $n$ is pivoted to lug $b^4$ and a single link $n^1$ is pivoted to lug $c^4$ and between links $n$, the centre pin being shown fitted with a push button as shown or extended to form handles for operating the toggle levers. When extended the centre pivot of the levers is pushed in slightly past the line of the centres of the outer pivots in the lugs $b^4$ $c^4$ to enable the toggles to be self locking in the extended position. As shown the guide flanges of the lugs are slotted to receive guide screws $p$ fixed in the member $a^4$. Flanges $k^4$ and fingers $o^4$ are preferably used in this form of the device.

The whole appliance in the various forms described is inexpensive to construct, the various lugs being capable of manufacture by pressing or stamping processes, while the flanged ring or annular member can either be produced by similar methods or machined from a tube of cast iron, steel or bronze.

I claim:—

1. A piston ring expander comprising a continuous non-expansible ring of angular cross section adapted to slide loosely over a piston and to receive the piston ring in its angle, a pair of relatively movable lugs carried by and extending outwardly from said continuous ring, fingers carried by said lugs and extending inwardly through said continuous ring, said fingers being relatively movable when the lugs are relatively moved, whereby to spread the piston ring into the angle of said continuous ring.

2. A structure as specified in claim 1, each movable lug having parallel flanges slidably receiving said continuous ring therebetween.

3. A structure as specified in claim 1, together with a spring interposed between said lugs for separating them to spread the piston ring.

4. A piston ring expander comprising a continuous non-expansible ring to slide loosely over a piston and adapted to surround a piston ring, means carried by said continuous ring for expanding the piston ring, and means on said continuous ring opposite said expanding means for forcing the piston ring diametrically to retain it in engagement with the expanding means.

5. A structure as specified in claim 3, said piston ring forcing means consisting of a pin passing movably through said continuous ring.

In testimony whereof he has affixed his signature.

ROBERT ALLEN.